United States Patent

[11] 3,619,129

| [72] | Inventors | Vincent Chiola;<br>Clarence D. Vanderpool, both of Towanda, Pa. |
|---|---|---|
| [21] | Appl. No. | 2,645 |
| [22] | Filed | Jan. 13, 1970 |
| [45] | Patented | Nov. 9, 1971 |
| [73] | Assignee | Sylvania Electric Products, Inc. |

[54] PROCESS FOR THE MANUFACTURE OF ANHYDROUS REFRACTORY METAL IODIDES
8 Claims, No Drawings

[52] U.S. Cl. .................................................. 23/22,
    23/15, 23/87, 260/658 R
[51] Int. Cl. .................................................. C01g .35/00,
    C01g 39/00, C01g 41/00
[50] Field of Search ........................................ 23/87, 15
    W, 22; 260/658

[56] References Cited
    UNITED STATES PATENTS
1,891,415  12/1932  Harlow et al. ................ 260/658
    FOREIGN PATENTS
451,379  9/1948  Canada ....................... 260/658

*Primary Examiner*—Edward Stern
*Attorneys*—Norman J. O'Malley, Donald R. Castle and William H. McNeill

ABSTRACT: Anhydrous refractory metal iodides can be prepared by reacting an alkyl iodide and a refractory metal chloride under controlled temperature conditions. After digesting for at least about 5 minutes, the refractory metal iodide is isolated and dried under a nonoxidizing atmosphere.

PROCESS FOR THE MANUFACTURE OF ANHYDROUS REFRACTORY METAL IODIDES

BACKGROUND OF THE INVENTION

1. Field of the Invention

This invention relates to an improved method for preparing refractory metal iodides. Specifically, it refers to a process for preparing anhydrous refractory metal iodides by reacting an alkyl iodide and a refractory metal chloride at a temperature of at least 35° C. for at least about 5 minutes.

2. Description of the Prior Art

The prior art described several ways of preparing anhydrous refractory metal iodides, but they have at least some disadvantages. One method of preparing anhydrous refractory-metal iodides is by the reaction of the refractory metal and iodine vapor at elevated temperatures. For example, tungsten iodide can be made in a tube furnace by the reaction of tungsten and oxygen-free iodine vapor at elevated temperatures. Maintaining iodine as an oxygen-free vapor is difficult and mixtures of iodides and/or oxides can result from this reaction. The $WI_2$ must then be isolated or extracted from the other compounds. Care must also be taken to heat the entire system to prevent solidification of the iodine and subsequent plugging of the system. Other methods which are described in the prior art include (1) heating a refractory metal chloride at about 400° C. with dried hydrogen iodide, and (2) decomposing aluminum triiodide with a refractory metal oxide at reduced pressure and at temperatures ranging from 200° C. to 400° C. for 24 to 48 hours. The disadvantages of these methods include one or more of the following: (1) dried hydrogen iodide is difficult to obtain and inconvenient to handle, (2) the product obtained is contaminated and the yields are low, (3) the product must be purified by sublimation, which is critical, because decomposition occurs at a temperature relatively close to that of sublimation, and (4) this method is not suited to preparation of commercial quantities.

It is believed, therefore, that a process that directly converts an alkyl iodide and a refractory metal chloride, under controlled reaction conditions, to a pure anhydrous refractory metal iodide, by a single reaction procedure, without using high temperatures, forming other undesirable salts, vaporizing iodine and maintaining iodine in a gaseous state, using special atmospheres, and is suitable for producing commercial quantities of refractory metal iodides, is an advancement in the art.

SUMMARY OF THE INVENTION

In accordance with one aspect of the invention, there is provided a process for preparing anhydrous refractory metal iodides directly from an alkyl iodide and a refractory metal chloride under controlled reaction conditions. The process comprises forming a reaction medium comprising an alkyl iodide and a refractory metal chloride in at least stoichiometric amounts to form a refractory metal iodide, adjusting the temperature of said resulting reaction medium to at least about 35° C., digesting said reacting solution for at least about 5 minutes at a temperature of at least about 35° C., to thereby form a refractory metal iodide, isolating said refractory metal iodide, and thereafter drying said refractory metal iodide under nonoxidizing conditions.

For a better understanding of the present invention, together with other and further objects, advantages and capabilities thereof, reference is made to the following disclosure and appended claims in connection with the above-described description of one of the aspects of the invention.

DESCRIPTION OF THE PREFERRED EMBODIMENTS

The present invention relates to a method of directly preparing anhydrous refractory metal iodides by reacting an alkyl iodide and a refractory metal iodide under controlled reaction conditions. Surprisingly, it has been found that it is possible to prepare refractory metal iodides by directly converting an alkyl iodide and a refractory metal chloride to a pure anhydrous refractory metal iodide and alkyl chloride in a single reaction procedure.

Although any alkyl iodide that has a boiling point of below about 120° C. can be used, methyl iodide and ethyl iodide are preferred. Said methyl iodide and said ethyl iodide can be mixed directly with the refractory metal iodide or can be dissolved in an inert solvent such as carbon tetrachloride, chloroform, carbon disulfide and the like, before mixing with said refractory metal chloride. Refractory metals are generally considered to be metals that have softening points of above about 1,500° C. Especially preferred sources of refractory metal chlorides are tungsten hexachloride, molybdenum pentachloride, niobium pentachloride, and tantalum pentachloride. At least stoichiometric equivalent amounts of said refractory metal chloride and said alkyl iodide are combined. Less than stoichiometric equivalent amounts result in an incomplete reaction and a refractory metal iodide product contaminated with a refractory metal chloride, which would necessitate further purification. A slight excess of alkyl iodide can be advantageously used to compensate for a possible loss of iodine during the reaction. The resulting aqueous reaction medium is adjusted to a temperature of at least about 35° C. Especially preferred is a temperature range from about 50° C. to about 120° C. Temperatures below about 35° C. generally are not sufficient enough to generate the reaction efficiently. Temperatures above about 120° C. are unnecessary and can result in too vigorous a reaction and subsequent loss of iodine. Although the reaction is generally performed at atmospheric pressure, alternative procedures can include reacting said reaction medium under reduced pressure and in vacuum. Although a digestion time of at least 5 minutes can be used, preferred digestion times are generally dependent on the refractory metals used and said digestion times can vary from about 5 minutes to about 96 hours. For example, when tungsten is the refractory metal, digestion times from about 10 minutes to about 30 minutes are generally preferred; when molybdenum is the refractory metal, digestion times from about 24 hours to 96 hours are generally preferred; and when niobium or tantalum is the refractory metal, digestion times from about 12 hours to about 36 hours are generally preferred. Digestion for shorter periods of time will result in incomplete conversion of the said reacting constituents and longer periods of time have the inherent disadvantages of economics. Conventional means if isolating the refractory metal iodide can be used, such as volatilization of the alkyl chloride. It is generally desired to recover the alkyl chloride as a byproduct. The solid refractory metal iodide is then dried under nonoxidizing conditions, such as, under vacuum. This is desirable to form a relatively stable anhydrous refractory metal iodide. The pure refractory metal iodide can be washed with an anhydrous iodine solvent until said solid is substantially free of excess iodine, that is, until the solvent contains no purple coloration. Anhydrous iodine solvents that are especially preferred are carbon disulfide, anhydrous benzene, ethyl ether, chloroform, and carbon tetrachloride. To more fully illustrate the present invention, the following detailed examples are presented. All parts, proportions, and percentages are by weight, unless otherwise given.

EXAMPLE 1

About 70.8 parts ethyl iodide and about 30 parts tungsten hexachloride are slowly added to a suitable reaction vessel and heated to a temperature from about 50° C. to about 100° C. for at least about 5 minutes and then allowed to cool to room temperatures. The solid blue-black product is washed with carbon disulfide or any other suitable anhydrous solvent for iodide until the product is substantially free of excess iodine, which is noted by the gradual loss of purple coloration of said solvent. The washed solid is dried at about room temperature under vacuum. The product is analyzed chemically and is found to contain 43.97 percent tungsten and 56.03 percent iodine. Theoretical values for tungsten diiodide ($WI_2$) are 42.0 percent by weight tungsten and 58.0 percent by weight iodine.

EXAMPLE 2

About 78 parts ethyl iodide and about 271 parts molybdenum pentachloride are slowly added to a suitable reaction vessel and heated to a temperature from about 50° C. to about 100° C. for about 96 hours and then allowed to cool to room temperature. The solid black product is washed with anhydrous benzene or any other suitable anhydrous solvent for iodine until the product is substantially free of excess iodine, which is noted by the gradual loss of purple coloration of said solvent. The washed solid is dried under vacuum. The product is analyzed chemically and is found to contain 30.9 percent molybdenum and 69.1 percent iodine. Theoretical values for molybdenum diiodide ($MoI_2$) are 27.43 weight percent molybdenum and 72.57 weight percent iodine.

EXAMPLE 3

About 78 parts methyl iodide and 27 parts niobium pentachloride are slowly added to a suitable reaction vessel and heated to a temperature from about 60° C. to about 100° C. for about 24 hours and then cooled to room temperature. The solid brown-black product is washed with carbon disulfide or any other suitable anhydrous solvent for iodine until the product is substantially free of excess iodine, which is noted by the gradual loss of purple coloration of said solvent. The washed solid is dried under vacuum. The product is analyzed chemically and is found to contain 29.4 percent weight niobium and 70.0 weight percent iodine. Theoretical values for niobium diiodide ($NbI_2$) is 26.79 weight percent niobium and 73.21 weight percent iodine.

EXAMPLE 4

About 78 parts ethyl iodide and about 35.8 parts tantalum pentachloride are slowly added to a suitable reaction vessel and heated to a temperature from about 50° C. to about 100° C. for about 24 hours and then cooled to room temperature. The heavy dark liquid product is dried by vacuum filtration at about room temperature. The reddish-brown product is analyzed chemically and is found to contain 43.2 weight percent tantalum and 56.6 weight percent iodine. Theoretical values for tantalum diiodide ($TaI_2$) are 41.6 weight percent tantalum and 58.4 weight percent iodine.

Similar results are obtained when other alkyl chlorides such as butyl chloride and pentyl chloride are substituted for methyl chloride and ethyl chloride.

While there has been shown and described what are at present considered the preferred embodiments of the invention, it will be obvious to those skilled in the art that various changes and modifications may be made herein without departing from the scope of the invention as defined by the appended claims.

We claim:

1. A process for preparing anhydrous refractory metal iodides, wherein said refractory metal is selected from the group consisting of tungsten molybdenum, niobium, and tantalum comprising the steps of:
   a. forming a reaction medium comprising a lower alkyl iodide, which has a boiling point below about 120° C., and a chloride of said refractory metal in at least stoichiometric amounts to form a iodide of said refractory metal;
   b. adjusting the temperature of said reaction medium to at least 35° C.;
   c. digesting said reaction medium for at least about 10 minutes at a temperature of at least about 35° C. to thereby form an iodide of said refracting metal;
   d. isolating the formed solid iodide of said refractory metal by washing same with an anhydrous, liquid organic iodine solvent until said solid iodide is free of any excess iodine;
   e. thereafter drying the iodide of said refractory metal under nonoxidizing conditions to thereby form a relatively stable anhydrous iodide of said refractory metal.

2. A process according to claim 1, wherein an alkyl chloride is formed and thereafter recovered as a byproduct.

3. A process according to claim 1 wherein said temperature of resulting reaction medium is from about 50° C. to about 120° C.

4. A process according to claim 3, wherein said alkyl iodide is selected from the group consisting of methyl iodide, ethyl iodide, and mixtures thereof.

5. A process according to claim 4, wherein said refractory metal is tungsten and said digesting time is from about 10 minutes to about 45 minutes.

6. A process according to claim 4, wherein said refractory metal is molybdenum and said digesting time is from about 24 hours to about 96 hours.

7. A process according to claim 3, wherein said refractory metal is niobium and said digesting time is from about 12 hours to about 36 hours.

8. A process according to claim 3, wherein said refractory metal is tantalum and said digesting time is from about 12 hours to about 36 hours.

* * * * *